United States Patent [19]

Malvern

[11] Patent Number: 4,820,008
[45] Date of Patent: Apr. 11, 1989

[54] INTEGRATED OPTICS RING RESONATOR

[75] Inventor: Alan R. Malvern, Bracknell, England

[73] Assignee: British Aerospace Public Limited Company, London, England

[21] Appl. No.: 120,534

[22] Filed: Nov. 13, 1987

[30] Foreign Application Priority Data

Nov. 18, 1986 [GB] United Kingdom ............... 8627570

[51] Int. Cl.$^4$ ............................................. G02B 6/00
[52] U.S. Cl. ............................ 350/96.10; 350/96.15; 350/96.32; 350/320; 356/350
[58] Field of Search ............ 350/96.10, 96.14, 96.15, 350/96.16, 96.20, 96.30, 96.32, 320; 356/350

[56] References Cited

U.S. PATENT DOCUMENTS

| 4,453,803 | 6/1984 | Hidaka et al. | 350/96.32 |
| 4,630,885 | 12/1986 | Haavisto | 350/96.15 |
| 4,676,583 | 6/1987 | Hicks, Jr. | 350/96.15 |
| 4,775,214 | 10/1988 | Johnson | 350/96.15 |
| 4,775,233 | 10/1988 | Kaneshi et al. | 350/96.15 |

FOREIGN PATENT DOCUMENTS

| 0088824 | 9/1983 | European Pat. Off. | 356/350 |
| 0270706 | 12/1986 | Japan | 350/96.16 |
| 2119130 | 5/1987 | Japan | 350/96.1 |

OTHER PUBLICATIONS

Casperson; "Cylindrical Laser Resonators"; J. of the Optical Society of America; vol. 63; No. 1; 01/1973; pp. 25-29.
"Substrate Tube . . . Fibers"; Stolen et al; Electronics Letters; 09/02/1982; vol. 18; No. 18; pp. 764-765.

Primary Examiner—William L. Sikes
Assistant Examiner—Xuan Thi Vo
Attorney, Agent, or Firm—Cushman, Darby & Cushman

[57] ABSTRACT

A ring resonator waveguide for a laser gyroscope comprises a ring of waveguide material (2) formed around the inside or outside surface of a hollow cylinder (3) or ellipsoid (4). Such a ring resonator waveguide is made by providing a hollow cylindrical substrate (1), depositing waveguide material (2) on the inside or outside surface of the hollow cylindrical substrate (1), heating the substrate (1) and blowing it to form a cylindrical or ellipsoidal (4) member, and cutting a circular section (5, 6) from the cylindrical member (3) or from a central portion of the ellipsoidal member (4).

20 Claims, 2 Drawing Sheets

INTEGRATED OPTICS RING RESONATOR

BACKGROUND OF THE INVENTION

A conventional laser gyroscope includes a coil of optical fibre waveguide wound around a circular former. Laser light is injected to travel in opposite directions around the coil and then, the light beams emerging from both ends of the coil are synthesised and applied to a light detector. By analysing the output of the light detector information on changes in phase and hence the rotation of the coil in space can be obtained.

Attempts have been made to manufacture an integrated optics ring resonator for a laser gyroscope by using a planar substrate and then forming a flat ring of higher refractive index in that planar substrate. Such integrated optics ring resonators rely on total internal reflection to contain light in both the plane of the planar waveguide and in the radial direction. Total internal reflection tends to cause losses especially in the radial direction at the lateral edges of the planar waveguide as a result of the roughness of this interface.

SUMMARY OF THE INVENTION

According to a first aspect of this invention a ring resonator waveguide for a laser gyroscope comprises a ring of waveguide material formed around the inside or outside surface of a hollow cylinder or ellipsoid.

With such an arrangement total internal reflection confines the light only in the radial direction and, in the axial direction of the cylinder or ellipsoid, laser modes are generated with different transverse modal patterns. The lowest order modes that can be carried by such a waveguide are a $TE_o$ mode with the E vector in the plane of the waveguide and a $TM_o$ mode with the E vector radially oriented which, in general, has a different resonant frequency to the $TE_o$ mode.

The next two highest modes are the $TE_1$ and $TM_1$ modes which have a single node and two antinodes. By polarising the incident light it is possible to select the TE or TM modes separately. A different optical path length between the TE and TM modes is equivalent to birefringence in planar optical waveguides or optical fibres and this implies that the polarisation along the principal axes will be maintained.

According to a second aspect of this invention a method of manufacturing a ring resonator waveguide for a laser gyroscope comprises providing a hollow cylindrical substrate, depositing waveguide material on the inside or outside surface of the hollow cylindrical substrate by any known method, heating it and blowing it to form a cylindrical or ellipsoidal member, and cutting a circular section from the cylindrical member or from a central portion of the ellipsoidal member to provide the ring resonator.

A cylinder can be likened to a planar version of a laser cavity with two plane mirrors. A laser cavity with two plane mirrors is a difficult cavity to align with any misalignment stopping resonance. Equally, with the waveguide formed around a cylinder any cone angle in the cylinder geometry causes misalignment and prevents resonance. For this reason it is much preferred that the waveguide is formed as an equatorial slice of an oblate or prolate ellipsoid. In this case the waveguide is curved when considered in a plane containing the axis of the ellipsoid with the curve being formed by a portion of an ellipse adjacent its major or minor axis. A sphere or spheroid is a special case of an ellipsoid in which the major and minor axes are substantially equal, and the waveguide may be formed by an equatorial slice from a sphere or spheroid. By analogy when the waveguide is formed around an ellipsoid that is similar to the case of a linear laser cavity with concave mirrors so that light is encouraged towards the central, substantially cylindrical portion of the ring. The ellipse may be arranged so that the curvature of the waveguide corresponds, by analogy, to a confocal cavity for a linear laser.

It is preferred that the waveguide material is deposited upon the inside of the ellipsoidal surface, or the inside of the substrate and, in this case, total internal reflection takes place substantially only around the radially outer surface of the waveguide material. It is preferred that the ring resonator also includes a coupler to couple light into and out of the waveguide material. The waveguide material may be buried below the surface by virtue of having a silica overlayer. This will help to reduce the scatter loss. Typically the coupler is formed by winding a clad optical fibre around a former which is circular in cross-section, polishing the cladding away from part of the winding to leave only a small portion of the cladding remaining, and then placing the polished portion against the waveguide. Alterantively a prism can be coupled to the waveguiding film. A silica overlayer may be used to reduce the coupling efficiency to the required value by varying its thickness to separate the prism from the waveguide. Evanescent coupling then takes place between light carried by the winding and the waveguide resonator with a coupling coefficient of typically 1000 ppm. Typically the cladding is polished back to a few micrometers away from the core on the winding.

Preferably the cylindrical substrate is that used for a typical clad fibre having a low loss of the order of 1 db/km. In these circumstances the preform is typically formed by chemical vapour deposition processing.

BRIEF DESCRIPTION OF THE DRAWINGS

A detailed example of a method and apparatus in accordance with this invention will now be described with reference to the accompanying drawings in which.

DETAILED DESCRIPTION

Figure 1:
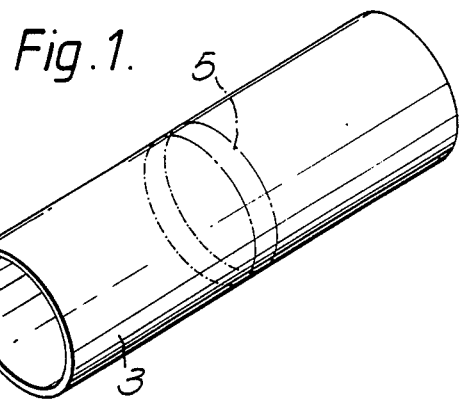
FIG. 1 is a perspective view of the first example.
Figure 2:
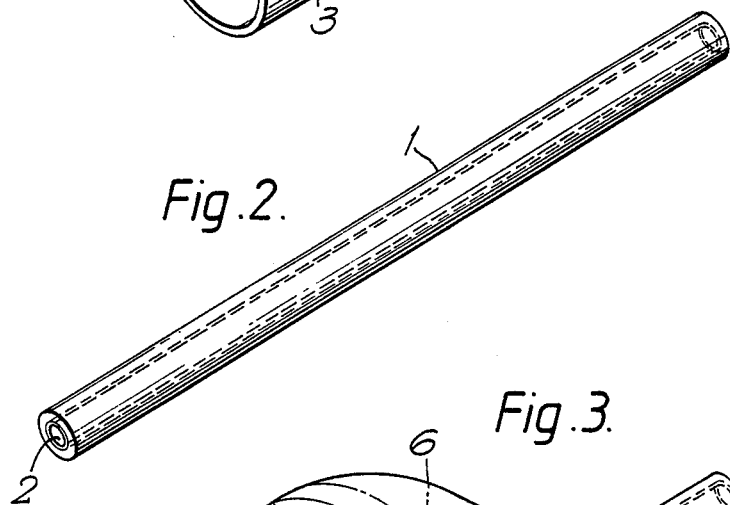
FIG. 2 is a perspective view of a preform.
Figure 3:
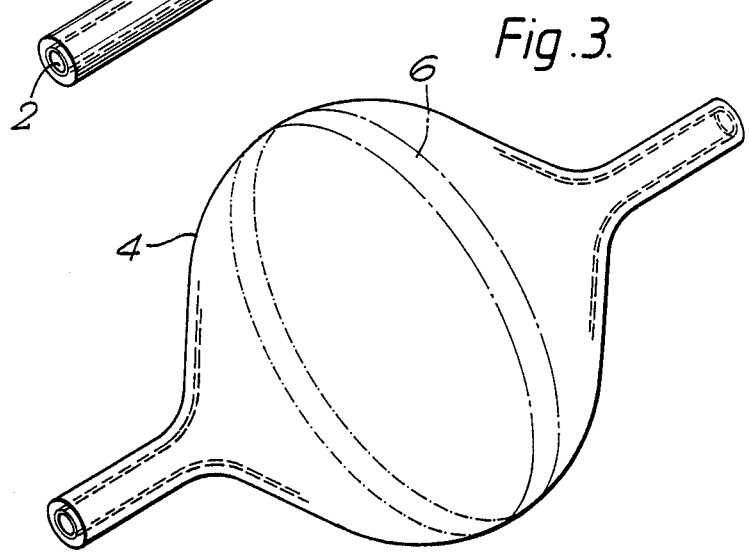
FIG. 3 is a perspective view of a preform after it has been blown into an ellipsoid and indicating the portion of ellipsoid to be used as the resonator.

A fibre optic preform has the form of a tube 1, see FIG. 2, with the waveguide layer 2 typically formed from germanium oxide deposited on the inside of the tube 1 which itself is typically formed from silica. Normally, this preform is drawn to provide an optical fibre but, in the present invention this preform is heated and blown to provide a cylinder 3 as shown in FIG. 1 or an ellipsoid 4 as shown in FIG. 3. As the preform is blown it expands but the germanium oxide 2 provides a continuous waveguide layer around its inside surface. A section 5 is then cut from the cylinder or the central section 6 cut from the ellipsoid to form the ring resonator.

Figure 4B:
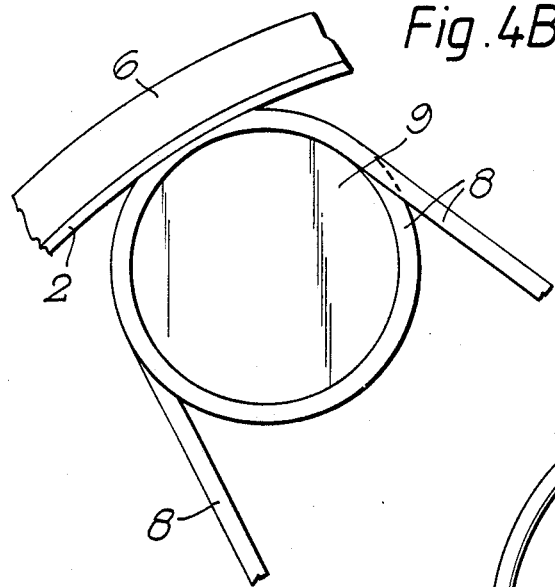
FIGS. 4A and 4B are an end elevation showing the complete ring resonator with light coupler and an enlarged detail; and, FIG. 5 is a diagram used to explain the theoretical analysis.
Figure 4A:
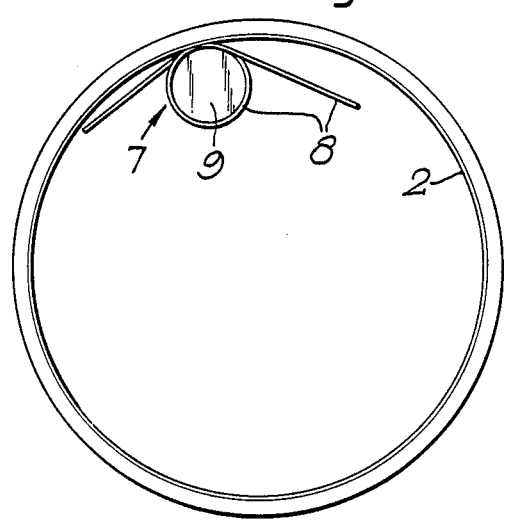

An optical coupler 7 as seen in FIGS. 4A and 4B is provided to couple light into and out of the waveguide 2 on the ring resonator. The coupler 7 comprises a clad optical fibre 8 wound around a substantially cylindrical former 9 and then its cladding is polished from one side of the winding until only a few microns of cladding remain. This polished portion of the winding is then placed immediately adjacent the inner surface of the waveguide layer 2 of the ring resonator and the light is evanescently coupled across the remaining few microns of cladding to provide a very small coupling ratio of the order of 1000 ppm.

The Appendix which follows provides an analysis of the modes that are capable of being sustained in an ellipsoidal resonator.

APPENDIX

Analysis of Ellipsoidal Resonator

A spherical resonator will have the light path along a geodesic of the sphere. An ellipsoid can be treated similarly by making the transformation.

$x' = \epsilon x$
$y' = y$
$z' = z$ where $\epsilon$ is the ellipticity of the ellipse, x y z are the co-ordinates of the sphere and x' y' z' are the co-ordinates of the ellipsoid.

Figure 5:
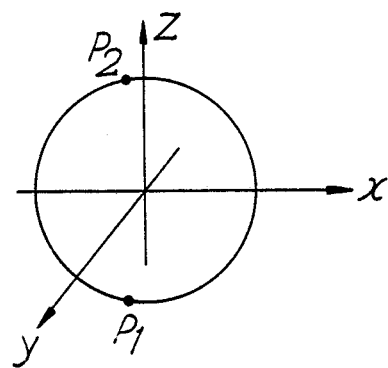

Consider now the sphere, illustrated in FIG. 5 and the arc length across a diameter. Consider points $P_1$ and $P_2$ with co-ordinates.

$(x_1\ y_1\ z_1)\ P_1$
$(x_2\ y_2\ z_2)\ P_2$

Assume $y_1 = y_2 = 0$ then $z = \pm\sqrt{[r^2 - x^2]}$
in this example:
$P_1\ (x_1\ 0 - \sqrt{[r^2 - x_1^2]})$
$P_2\ (x_2\ 0 + \sqrt{[r^2 - x_2^2]})$ The angle between the two points, $\theta$, is given by:

$$\cos\theta = \frac{r_1 \cdot r_2}{r^2} = \frac{x_1 x_2}{r^2} - \sqrt{\left[1 - \left(\frac{x_1}{r}\right)^2\right]}\sqrt{\left[1 - \left(\frac{x_2}{r}\right)^2\right]}$$

Now $\theta = \pi - \delta$ $$\cos\theta = \cos(\pi - \delta) = -\cos\delta \simeq -\left(1 - \frac{\delta^2}{2}\right)$$

and $\left(1 - \frac{x_1^2}{r^2}\right)^{\frac{1}{2}} \simeq \left[1 - \frac{1}{2}\left(\frac{x_1}{r}\right)^2\right]$ as $x_1 << r$ so that $$-\left(1 - \frac{\delta^2}{2}\right) = \frac{x_1 x_2}{r^2} - \left(1 - \frac{1}{2}\left(\frac{x_1}{r}\right)^2\right)\left(1 - \frac{1}{2}\left(\frac{x_2}{r}\right)^2\right)$$

$$\delta = \sqrt{2\left[1 + \frac{x_1 x_2}{r^2} - \left(1 - \frac{1}{2}\left(\frac{x_1}{r}\right)^2 - \frac{1}{2}\left(\frac{x_2}{r}\right)^2\right)\right]^{\frac{1}{2}}}$$

By neglecting terms in $x^4/r^4$ as small.

The arc length s is given by $r\theta = r\pi - r\delta$ $$\delta = \sqrt{2}\sqrt{\left[\frac{x_1 x_2}{r^2} + \frac{1}{2}\frac{x_1^2}{r^2} + \frac{1}{2}\frac{x_2^2}{r^2}\right]}$$

$$s = \pi r - \sqrt{2r}\sqrt{\left[\frac{x_1 x_2}{r^2} + \frac{1}{2}\frac{x_1^2}{r^2} + \frac{1}{2}\frac{x_2^2}{r^2}\right]}$$

Now converting to the ellipsoid we have:

$$s = \pi b - \sqrt{2}\,\epsilon b\sqrt{\left[\frac{x'_1 x'_2}{b^2} + \frac{1}{2}\frac{x'_1{}^2}{b^2} + \frac{1}{2}\frac{x'_2{}^2}{b^2}\right]}$$

where b is the minor axis of the ellipsoid (with the x axis as axis of symmetry) and $\epsilon$ the ellipticity of the ellipse.

The Fresnel Huygens equation relates the field $u_1(x_1)$ at $P_1$ to the field at $P_2$, $u_2(x_2)$. For a resonant path.

$$\gamma_1 u_1(x_1) = \sqrt{\left[\frac{i}{\lambda d}\right]} \int_{-\infty}^{\infty} dx_2\, \exp[-ik\,f(x_1 x_2)]\, u_2(x_2)$$

and $$\gamma_2 u_2(x_2) = \sqrt{\left[\frac{i}{\lambda d}\right]} \int_{-\infty}^{\infty} dx_1\, \exp[-ik\,f(x_1 x_2)]\, u_1(x_1)$$

where $\gamma_1$ and $\gamma_2$ are complex costants, $d = \pi b$ and $$f(x_1 x_2) = \epsilon\sqrt{2b}\sqrt{\left[\frac{x_1 x_2}{b^2} + \frac{x_1^2}{2b^2} + \frac{x_2^2}{2b^2}\right]}$$

for a complete round trip, for a resonant mode the original field pattern must be recreated except for a multiplication constant, so that:

$$\gamma_1\gamma_2 u_1(x_1) = \frac{i}{\lambda d}\int_{-\infty}^{\infty} dx_2\, \exp[-ik f(x_1 x_2)]\int_{-\infty}^{\infty} dx'_1\, \exp[-ik f(x'_1 x_2)]\, u_1(x'_1)$$

This equation can be solved numerically to give the values of $\gamma$ (the loss and phase shifts) and u(x), the eigenvectors for the modes of the resonator.

I claim:

1. A ring resonator waveguide for a laser gyroscope comprising a hollow cylindrical substrate, said hollow cylindrical substrate having an interior surface, an exterior surface and an axis of generation, said ring resonator waveguide further comprising a ring of waveguide material extending around a part of one of said interior and exterior surfaces of said hollow cylindrical substrate, said waveguide material preventing light from leaving said waveguide material in a radial direction relative to said cylinder so that said ring forms a resonate optical cavity.

2. A method of manufacturing a ring resonator waveguide for a laser gyroscope comprising providing a hollow cylindrical substrate having interior and exterior surfaces, depositing waveguide material in a substantially continuous coating on one of said interior and exterior surfaces of said hollow cylindrical substrate, heating and blowing said hollow cylindrical substrate thereby forming a cylindrical member and cutting a substantially circular ring from said cylindrical member to thereby form said ring resonator comprised of said waveguide material, said waveguide material of said resonator preventing light from leaving said waveguide material in a radial direction relative to said cylinder.

3. The ring resonator of claim 1, wherein said waveguide material extends around a part of said inner surface of said substrate.

4. The ring resonator of claim 3, said resonator further comprising a layer of silica, said layer of silica overlaying said waveguide material.

5. The ring resonator of claim 1, wherein said ring resonator further includes coupler means, said coupler means being adapted to couple light into and out of said waveguide material.

6. The ring resonator of claim 5, wherein said coupler means comprises a former of substantially circular cross section, a winding of clad optical fibre, said winding of clad optical fibre being wound around said former and a polished portion of said winding, said polished portion of said winding being positioned against said waveguide material, cladding of said optical fibre winding having been polished away in said polished portion whereby light carried by said clad optical fibre is coupled to said waveguide material.

7. The method of claim 2, wherein said method further comprises the step of forming an optical coupler, said step comprising winding a clad optical fibre around a former of substantially circular cross-section thereby forming a winding, polishing cladding away from a portion of said winding leaving only a small portion of said cladding remaining, and placing said polished portion of said winding against said waveguide material, whereby light carried by said clad optical fibre is coupled to said waveguide material.

8. The method of claim 2, wherein said waveguide material is deposited upon said interior surface of said hollow cylindrical substrate.

9. The method of claim 2, wherein said method further includes the step of applying a coating of silica to said one of said interior and exterior surfaces, thereby overlaying said waveguide material.

10. The ring resonator of claim 1, wherein said waveguide material is germanium oxide.

11. A ring resonator waveguide for a laser gyroscope comprising a hollow ellipsoidal substrate, said hollow ellipsoidal substrate having an interior surface, an exterior surface and an axis of generation, said ring resonator waveguide further comprising a ring of waveguide material extending around a part of one of said interior and exterior surfaces of said hollow ellipsoidal substrate and lying in a plane substantially normal to said axis of said hollow ellipsoidal substrate, said waveguide material preventing light from leaving said waveguide material in a radial direction relative to said ellipsoid so that said ring thereby forms a resonant optical cavity.

12. A method of manufacturing a ring resonator waveguide for a laser gyroscope comprising providing a hollow cylindrical substrate having interior and exterior surfaces, depositing waveguide material in a substantially continuous coating on one of said interior and exterior surfaces of said hollow cylindrical substrate, heating and blowing said hollow cylindrical substrate thereby forming an ellipsoidal member and cutting an equatorial slice from said ellipsoidal member to thereby form said ring resonator comprised of said waveguide material, said waveguide material of said resonator preventing light from leaving said waveguide material in a radial direction relative to said ellipsoid.

13. The ring resonator of claim 11, wherein said waveguide material extends around a part of said inner surface of said substrate.

14. The ring resonator of claim 13, said resonator further comprising a layer of silica, said layer of silica overlaying said waveguide material.

15. The ring resonator of claim 11, wherein said ring resonator further includes coupler means, said coupler means being adapted to couple light into and out of said waveguide material.

16. The ring resonator of claim 15, wherein said coupler means comprises a former of substantially circular cross section, a winding of clad optical fibre, said winding of clad optical fibre being wound around said former and a polished portion of said winding, said polished portion of said winding being positioned against said waveguide material, cladding of said optical fibre winding having been polished away in said polished portion whereby light carried by said clad fibre is coupled to said waveguide material.

17. The method of claim 12, wherein said method further comprises the step of forming an optical coupler, said step comprising winding a clad optical fibre around a former of substantially circular cross-section thereby forming a winding, polishing cladding away from a portion of said winding leaving only a small portion of said cladding remaining, and placing said polished portion of said winding against said waveguide material, whereby light carried by said clad optical fibre is coupled to said waveguide material.

18. The method of claim 12, wherein said waveguide material is deposited upon said interior surface of said hollow ellipsoidal substrate.

19. The method of claim 12, wherein said method further includes the step of applying a coating of silica to said one of said interior and exterior surfaces, thereby overlaying said waveguide material.

20. The ring resonator of claim 11, wherein said waveguide material is germanium oxide.

* * * * *